United States Patent [19]

Barrett

[11] Patent Number: 5,723,336
[45] Date of Patent: Mar. 3, 1998

[54] VALVED EXTENDED TIME-TEMPERATURE INDICATOR

[75] Inventor: Richard B. Barrett, Chatham, N.J.

[73] Assignee: Air Liquide America Corporation, Houston, Tex.

[21] Appl. No.: 597,935

[22] Filed: Feb. 7, 1996

[51] Int. Cl.$^6$ .................................................. G01K 1/02
[52] U.S. Cl. .................... 436/1; 422/57; 422/61; 116/219
[58] Field of Search ................ 436/1; 422/56–57, 422/61; 116/219

[56] References Cited

U.S. PATENT DOCUMENTS

| | | | |
|---|---|---|---|
| 5,058,088 | 10/1991 | Haas | 368/327 |
| 5,446,705 | 8/1995 | Haas et al. | 368/327 |
| 5,476,792 | 12/1995 | Ezrielev et al. | 436/1 |

Primary Examiner—Lyle A. Alexander
Attorney, Agent, or Firm—Burns, Doane, Swecker & Mathis

[57] ABSTRACT

Provided is a valved extended time-temperature indicator. This indicator comprises a base substrate and two transparent polymeric layers on top of the base substrate in adhesive contact with each other. The indicator further comprises a valve member which is restrictive of the flow of dye therethrough, which valve is interposed between the two polymer layers such that there is no adhesive contact between the two polymer layers in the area of the valve. A deposit of colored dye is either on the lower polymeric layer, in which case the valve may be in physical contact with the dye, or on the base substrate. In either case the dye is visible through the polymeric layers, with the dye being positioned directly below the valve member, however, so that the valve member at least partially obstructs visibility of the dye deposit.

10 Claims, 4 Drawing Sheets

```
TOP    ##############  <- 10 polyolefin
       //////////////  <- 11 Adhesive
       xxx             <- 20 Valve
       ////////        <- 30 Adhesive
       #########       <- 31 polyolefin
       *******         <- 32 Ink (in "reservoir")
       ||||||||||||||  <- 40 Backing
BOTTOM //////////////  <- 41 Adhesive (Optional)
```

```
TOP   #############  <- 10 polyolefin
         ///////////  <- 11 Adhesive
             xxx      <- 20 Valve
          ////////    <- 30 Adhesive
        #########     <- 31 polyolefin
          *******     <- 32 Ink (in "reservoir")
      ||||||||||||||| <- 40 Backing
BOTTOM ///////////////<- 41 Adhesive (Optional)
```

VALVED EXTENDED TIME-TEMPERATURE INDICATOR

BACKGROUND OF THE INVENTION

1. Field of the Invention

This invention relates to time indicator devices for recording extended time-temperature relationships. In particular, the present invention describes time indicators that record the duration of exposure to a narrow temperature range, in excess of a predetermined temperature, by means of controlled diffusion of dye, with the time indication being useful for numerous finite cycles of exposure.

2. Description of the Prior Art

Medical devices historically fell into two distinct categories: (1) reusable and (2) disposable. The economic demands of modern medical practice have lead to devices that are too expensive to be immediately disposable but, nonetheless, have a finite lifetime. The term "resposables" has been given to these devices which during their useful lifetime will undergo multiple sterilization cycles.

The "fitness for use" of this type of equipment can be maintained by incorporating a means of demonstrating the degree of usage. In this way the user has a means of knowing when the "resposable" will no longer function properly and cause damage to the patient. The present invention demonstrates how the number of sterilization cycles experienced by the "resposable" can be measured, which by inference informs the user the degree of service the device has had.

Many prior art time indicator devices have been designed for the low temperature conditions (−20° C. to +10° C.) associated with the safe storage of food. A low temperature indication device incorporating a paper carrier, or wick, is described by U.S. Pat. No. 4,038,873. It discloses a device based on a diffusing medium that liquefies at or above a predetermined temperature. The liquified diffusing medium is supported by a paper carrier which it impregnates when the device is "activated" or made ready for use. Immediately after "activation" the TTI is rapidly brought below the temperature that it is designed to monitor. In this way the liquid in the wick solidifies and no longer functions as a carrier for the indicating material. Failure to rapidly solidify the liquid "keeps the clock running" and leads to false interpretation of the signal.

The indicating material is a dye composition capable of diffusing through the paper-supported diffusing medium, when it liquifies, at a temperature in the range it is designed to monitor.

Another time indicator device requiring activation is disclosed in U.S. Pat. No. 5,120,137 which describes a reservoir containing an indicating material that liquifies at or above a predetermined temperature. The reservoir is mounted on a base sheet, and a removable barrier is interposed between the reservoir and a wick of very fine interconnected fibers. Removing the barrier activates the device by placing the wick in contact with the reservoir, thereby enabling the migration of the indicating material along the wick at a controlled rate upon liquification.

Time indicator devices where dye migrates vertically through numerous layers, including adhesive layers have been described in the prior art. For example, see U.S. Pat. No. 4,903,254 which relates to a time indicator useful for use as a security badge. The badge includes a four layer front part and a two layer rear part. The front part has, overlying each other, a transparent front support layer with a front print display surface, an adhesive and dye display layer with a front dye display surface, an optical barrier layer, and an adhesive and dye dissolver layer. The rear part has overlaying each other, a dye film layer and a backup member layer. Upon issue of the badge, a release sheet is peeled off the dye film layer and the front part is overlayed and pressed down upon the rear part, with the adhesive and dye dissolver layer in the dye film layer forming an assembly joint therebetween. The time interval then begins and the dye migrates from the dye film layer, in series, through the assembly joint, the dye dissolver layer, the optical barrier layer, the adhesive and dye display layer to the front dye display surface, where it forms expiration notice word and diagonal voiding bars after expiration to the time interval. See also U.S. Pat. Nos. 5,364,132; 5,058,088; and 5,446,705.

In U.S. Pat. No. 5,476,792, there is described an indicator device unaffected by normal ambient conditions, but which measures elapsed time only when a certain narrow range of elevated temperatures is obtained. Such a device has particular utility when helping enumerate the number of times a medical device has been subjected to steam autoclave sterilization. The device comprises a reservoir of diffusible dye which could take a variety of forms, and a diffusing medium such as heat shrinkable polyolefin, which serves the dual role of affixing the indicator device. In use, the printed pattern is diffused at a predictable and reproducible rate when held within a narrow temperature range of the sterilization process. In one embodiment, a small circle gradually fills in with the passage of sequential sterilization cycles.

While such an indicator device works excellently, however, the simple graphical design lends itself to a limited duration for dye diffusion. There exists the need for indicating devices capable of indicating a significantly greater number of cycles, which will often require more control of the duration of dye diffusion.

Accordingly, it is an object of the present invention to provide an indicator device that is useful for a significant number of cycles.

Still another object of the present invention is to provide an indicator device which provides great flexibility with regard to the surface to which it is secured.

Yet another object of the present invention is to provide a time indicator device which works effectively and efficiently for indicating exposure of a device above a predetermined temperature.

These and other objects of the present invention will become apparent to one skilled in the art upon a review of the following disclosure, the figures of the drawing, and the claims appended hereto.

SUMMARY OF THE INVENTION

The foregoing objectives are provided by a valved extended time-temperature indicator. This indicator comprises a base substrate and two transparent polymeric layers on top of the base substrate in adhesive contact with each other. The indicator further comprises a valve member which is restrictive of the flow of dye therethrough, which valve is interposed between the two polymer layers such that there is no adhesive contact between the two polymer layers in the area of the valve. A deposit of colored dye is either on the lower polymeric layer, in which case the valve may be in physical contact with the dye, or on the base substrate. In either case the dye is visible through the polymeric layers, with the dye being positioned directly below the valve member, however, so that the valve member at least partially obstructs visibility of the dye deposit.

In the operation of the valved indicator the dye migrates laterally through the adhesive around the valve member, with the migration in the adhesive on top of the valve being inward so that the dye collects over the valve member, and with the migration occurring only for the length of time a certain predetermined temperature is reached.

Among other things, the present invention is based upon a recognition that insertion of the valve member will restrict and control the flow of dye. While the presence of the valve would generally appear to contribute to a circle of increasing diameter of dye, it was surprisingly discovered that once the dye reached the adhesive layer above the valve, diffusion was inwards so that the dye collects above the valve. This surprising occurrence renders the valve as a controlling factor with regard to the outward migration of the dye so that the outward migration of the dye is in a well defined outer margin. The collection of the dye above the valve also provides an excellent indicator as to the length of time of exposure to a certain predetermined temperature or of the number of finite heating cycles through which a device has been exposed. It is through the successful restriction and control of dye flow that the present invention can realize a significant number of heating cycles.

The valve member can be any material which is impervious to the diffusion of dye, or at least greatly restrictive to the flow of dye therethrough. In a preferred embodiment, the valve member is aluminum foil.

DETAILED DESCRIPTION OF THE PREFERRED EMBODIMENTS

The valve member inserted into the time indicator of the present invention controls and slows the rate of flow of the dye from the reservoir. Once the dye has diffused around the valve member, inward migration occurs so that the dye collects above the valve member. This phenomenon allows the indicator to be extremely effective, efficient and simple in its construction while providing a possibility of numerous additional cycles with respect to that possible through the use of prior art devices.

The valve member used can be any dye impervious material, or at least a material which greatly restricts the flow of dye therethrough. By being restrictive to the flow of dye, the dye will migrate around the valve member through the adhesive, through which the dye migrates much more quickly. Preferred materials which can be used as a valve member include aluminum foil, or other dye impervious materials.

The placement of the valve member in the indicator is over the dye reservoir in order to partially obscure the dye reservoir. In a preferred embodiment, the valve member and dye reservoir are circular in shape so that visibly the dye reservoir appears as a rim due to the obstruction of the valve member. The partial obstruction of the dye reservoir can also be due to a color contrast. For example, if the valve member is black, the dye can be red. The color contrast will make the dye reservoir appear as a red rim. Also, a blending of colors can be used to create a third color. For example, the valve member can be yellow and the dye blue, so that the dye reservoir appears as a blue rim. As the dye migrates and collects over the valve, however, it will appear as a green colored circle.

In another embodiment, the reservoir can contain a mixture of migrating dyes with the dyes having different migration rates, or a mixture of a pigment and dye can be used. As a result, the pool that collects above the valve can appear as a third color, and/or the color of the rim can also change.

Figures 1, 2:
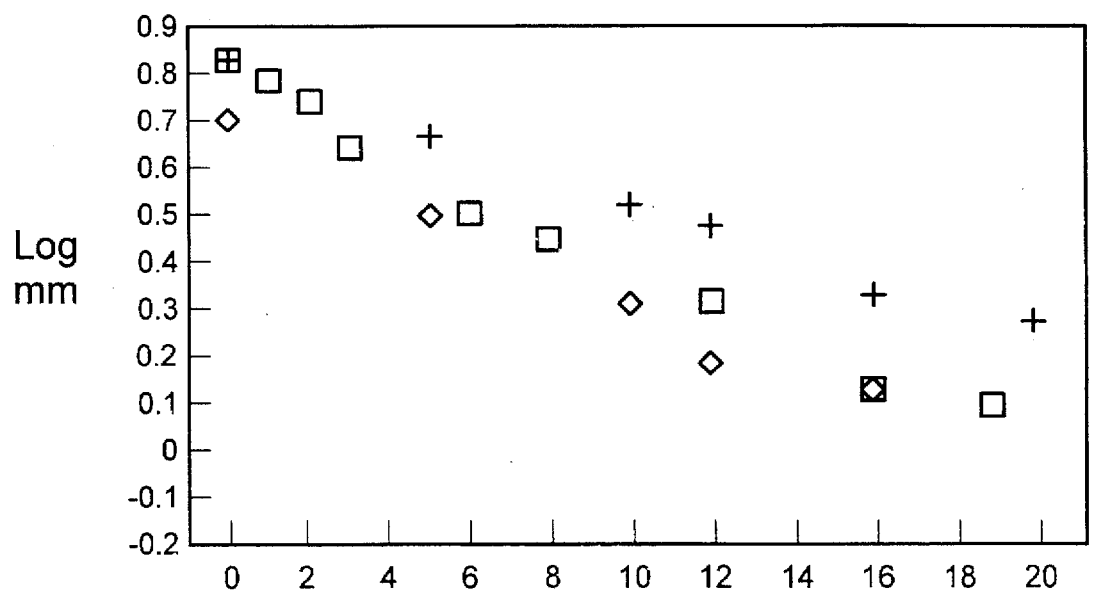
FIG. 1 is a schematic of a time indicator and its layers in accordance with the present invention.
FIG. 2 is the graphical representation of the number of cycles one can achieve with the time indicator having the valve construction of the present invention.

Referring now to FIG. 1, provided is a schematic representation of a construction of a time indicator device in accordance with a preferred embodiment of the present invention. The topmost film 10 provides a protective surface for the device, and can be any suitable polymeric material, such as a polyolefin. Its adhesive backing 11 can be used to anchor the topmost film to the backing surface or base substrate 40, and also secure the other components of the indicator within the laminated device. A valve 20 is interposed between the topmost layer and a second polymeric layer, which two layers are in adhesive contact. In the figure, both polymeric layers have an adhesive face. The adhesive surface 11 of the topmost layer and the adhesive surface 30 of the lower polymeric layer are in adhesive contact with each other. The valve is interposed between adhesive surface 11 and adhesive surface 30.

A supply of dye 32 exists between the lower polymeric layer 31 and the substrate backing 40. The supply of dye can be printed or coated onto the back of either the lower polymeric layer 31 or the top side of backing 40. The dye permeable backing or substrate 40 provides a surface for visualization of the functioning indicator, and it also may or may not be provided with an adhesive backing 41 in order to allow the device to be secured to a particular device, e.g., medical device.

In one embodiment, the dye is printed as a fully closed circle. However, the circle is partially masked with valve 20, which is cut in a circle of a smaller diameter. Visually, this results in a pattern that is similar to a rim of dye. Under ordinary ambient conditions, e.g., below 120° F., this visual pattern is stable. In use, at steam sterilization temperatures ranging from 250° F. to 273° F., the dye migrates laterally in polyolefin layer 31. When 250° F. is used as the temperature of exposure, for example, it may take 300 minutes to effect complete dye migration. If each heating cycle is 15 minutes long, 20 cycles can be realized. At 273° F., complete migration may be effected after 220 minutes of exposure. Because of the higher temperature, the length of the heating cycle may only be 11 minutes, which again will provide 20 cycles. The number of exposure minutes and cycles possible, of course, will depend on the adhesive dye and the polymer selected for construction of the indicator.

When viewed from the top surface the rim appears initially to have expanded. With succeeding time at steam sterilization temperature the dye migrates through polyolefin layer 31 and into the cojoined adhesive layers 11 and 30. The dye continues to migrate and collect above the valve in order to visually fill in the circle by covering the valve member.

Surprisingly, it has been found that the valve member is a controlling and limiting factor in the dye diffusion. It has been found that the diffusing dye in the adhesive is substantially limited to the polymeric (31) region at the perimeter of the valve. With subsequent sterilization cycles the dye continues to diffuse through the adhesive from the reservoir which is occluded by the valve, but its diffusion does not continue in an outward pattern. For reasons not fully understood, the preferred direction of diffusion once the dye diffuses past the valve is inwards. Thus, once the dye reaches adhesive surface layer 11 over the valve, the dye changes direction of migration from outward around the valve to inward above the valve in order to collect above the valve. The result is that the outward migration of the dye is limited and controlled resulting in well defined outer margins.

Up to 20 or more cycles, e.g., steam sterilization cycles, have been realized before the valve and surrounding dye rim appear uniform, signalling the end of the useful life of the indicator, and by reference, the useful life of the device to which it is attached.

Polymers suitable for use or the polymer layers with the present invention include ethylene vinyl acetate, polyesters, polyethylene, polyethylene/ethylene acrylic acid, low density polyethylene, polypropylene, polystyrene, polyvinyl chloride and polyvinylidine chloride. In a preferred embodiment of the present invention, crosslinked analogs of polymers having melt temperatures or melting points above the temperature to be monitored are employed. Such crosslinking renders the polymer thermosetting and therefore non-fluid at or above the polymer melting point. This permits the use of polymers that would ordinarily be liquid at the predetermined temperature. To be suitable for use with the present invention, a crosslinked thermosetting polymer must not thermally decompose at a temperature within the heat history to be experienced by the polymer composition.

Depending upon the end-use requirements, the polymer may be utilized in its unmodified state, or it may optionally contain amounts up to 15 percent based on the weight of the polymer of art-recognized additives such as one or more blend-compatible polymers, pigments, reinforcing fillers, stabilizers, antidegradants, antioxidants, processing aids, adhesives, plasticizers, and the like. For this reason, the polymer component of the present invention is referred to as a polymer composition. The polymer composition must not contain levels of pigments or hiding compositions that would obscure observation of the diffusion of the dye composition therethrough.

As will be readily appreciated, selection of a polymer composition for a given end-use application will depend upon the softening point of the polymer composition. The softening point of the polymer composition should be as close as practical to the predetermined temperature to be used. In other words, the softening point of the polymer composition should be at about the predetermined temperature to be monitored. Suitable polymer compositions will have softening points up to about 20° C. above, but no more than 5° C. below, the predetermined temperature to be monitored. As is well understood by those of ordinary skill in the art, polymer composition softening points are determined by the procedures defined by ASTM-D2398, the particulars of which are incorporated herein by reference thereto.

Polymer compositions having softening points up to about 15° C. above the predetermined temperature are preferred and polymer compositions having softening points up to about 1° C. above the predetermined temperature are even more preferred. In preferred compositions, the polymer composition softening point is no more than 1° C. above the predetermined temperature to be monitored. For example, for steam sterilization at 134° C., cross-linked polypropylene having a softening point of 135° C. is a preferred polymer.

The present invention is particularly useful for monitoring exposure to various sterilization conditions, including saturated steam at 15 psig and 121° C., saturated steam at 27 psig and 134° C. and dry heat at 160° C. Thus, a polymer composition having a softening point between about 116° C. and 151° C. is suitable for use in indicator devices to be exposed to saturated steam at 15 psi and 121° C. A polymer composition having a softening point between about 129° C. and about 164° C. is suitable for use with indicator devices to be exposed to saturated steam at 27 psig and 134° C. Polymer compositions having softening points between about 155° C. and about 190° C. are suitable for use in indicator devices to be exposed to dry heat at 160° C.

The polymer composition component for the indicator devices of the present invention can be formed directly from the resulting blend or die-cut from films or coatings formed therefrom. As such, the polymer compositions of the present invention can be directly extruded, calendared, compression-molded, injection-molded, thermoformed or otherwise cast, by conventional solvent-free methods well-known to those of ordinary skill in the art.

The present invention contemplates forming polymer composition components consisting of pure polymer essentially free of any additives. Therefore, the above-described techniques for forming the polymer composition component may be applied to an essentially pure base polymer that has not been compounded with any additives.

The dye composition component of the present invention may be formulated with any of various known polymer-compatible organic dyes. Essentially any organic dye capable of diffusing into a dye-compatible polymer and/or adhesive at temperatures above the polymer softening point is suitable for use with the present invention. The present invention is universally applicable to essentially any polymer-compatible dye. Solvent dyes are typically used.

The dye composition component of the present invention is preferably compounded into a dye or coating composition. The dye or coating composition should contain one or more dye compounds capable of diffusion into the polymer and adhesive within a temperature range defined by the predetermined temperature to be monitored and the predetermined temperature. As discussed previously, a mixture of dyes can be used. Suitable dye compounds include: non-ionic azo or diazo dyes, anthraquinone and carbonyl dyes.

Indicator devices for use in medical or food related areas should contain non-toxic dye compounds. For the sterilization end-uses previously described, oil-soluble D&C dyes are preferred. Examples of such dyes are D&C Red #17, D&C Green #6, DaC Violet #2, D&C Yellow #11, and D&C Green #6.

The dye compound-containing dye and coating compositions which serve as the dye composition component of the present invention also include various conventional additives for dye and coating compositions. Examples of suitable conventional additives include solvents, surfactants, releasing agents, carriers, lubricants, extenders, biocides, drying agents, dispersing agents, defoamers, rheology and viscosity modifiers, and the like.

Such additives are generally present in amounts between about 60 and about 99 percent by total weight and preferably in amounts between about 80 and about 95 percent by total weight.

The dye-compound containing dye or coating compositions of the present invention are prepared by conventional methods, using any art-recognized method for compounding a dye or coating composition. Typically a dispersion of the dye compound and any additives is milled with size-reducing media such as stones or sand, until a fine and uniform composition is obtained.

The dye composition is then placed in contact with the polymer composition. The amount of dye composition required is such that the rate of diffusion of the dye composition in the polymer composition will be finite and controllable.

The proper quantity of dye to be employed can be readily determined by one of ordinary skill in the art without undue experimentation. Typically, an amount of the dye composition between about 1 and about 10 mg per cc of the polymer composition is suitable for use with the present invention, with a quantity between about 2 and about 9 mg per cc being more preferred, and a quantity between about 3 and about 8 mg per cc being most preferred.

The adhesive must be able to withstand the environment in which it is to be used. The adhesive must maintain its adhesive properties at the predetermined temperature and in the chemical environment. It is also preferred that only at the predetermined temperature or above is the dye capable of migrating through the adhesive. Any commercial adhesive can be used which is accordingly suitable. Most preferred adhesives include acrylic adhesives.

The invention will be illustrated in greater detail by the following specific examples. It is understood that these examples are given by way of illustration and are not meant to limit the disclosure of the claims to follow. All percentages in the examples, and elsewhere in the specification, are by weight unless otherwise specified.

EXAMPLE

A valved extended time-temperature indicator in accordance with the present invention was prepared using the construction shown in FIG. 1. A dye impermeable backing was used as the basic substrate. The polyolefin bottom layer 31 having an adhesive face 30 and a dye reservoir printed thereon 32 was placed over the backing. The polyolefin upper layer having an adhesive face 11 was placed on top of the lower polyolefin layer so that the two adhesive faces were in contact, except that an aluminum foil valve 20 was interposed between the two adhesive faces such that the valve partially obstructed the view of the dye reservoir. The polyolefin used was a 2 mil polypropylene available from Ritrama Duramark of Minneapolis, Minn., and the adhesive face was an 0.8 mil solvent based acrylic exhibiting a glass transition temperature of −55° C.

Three such polymer foil valve constructions were made and tested through a number of 10 minute cycles where the temperature was raised to 273° F. (134° C.). The inner diameter, i.e., the diameter of the visible valve, was measured after each cycle. The results of the measurements are presented below in the table. As well, the logarithm of the internal diameter was also calculated.

TABLE

Apparent Inner Diameter and Log Din After Sterilization at 134° C. for Indicated Number of Cycles

| Trial: | A | | B | | C | |
|---|---|---|---|---|---|---|
| OD rim: | 9.94 mm | | 9.32 mm | | 9.28 mm | |
| Cycles | Din A | LDin A | Din B | LDinB | Din C | LDIN C |
| 0 | 6.48 mm | 0.812 | 6.48 mm | 0.812 | 4.98 mm | 0.697 |
| 1 | 5.85 | 0.767 | | | | |
| 2 | 5.34 | 0.728 | | | | |
| 3 | 4.28 | 0.631 | | | | |
| 4 | | | | | | |

TABLE-continued

Apparent Inner Diameter and Log Din After Sterilization at 134° C. for Indicated Number of Cycles

| Trial: | A | | B | | C | |
|---|---|---|---|---|---|---|
| OD rim: | 9.94 mm | | 9.32 mm | | 9.28 mm | |
| Cycles | Din A | LDin A | Din B | LDinB | Din C | LDIN C |
| 5 | | | 4.54 | 0.657 | 3.08 | 0.489 |
| 6 | 3.14 | 0.497 | | | | |
| 8 | 2.78 | 0.444 | | | | |
| 9 | | | | | | |
| 10 | | | 3.32 | 0.521 | 2.06 | 0.314 |
| 12 | 2.1 | 0.322 | | | | |
| 12 | | | 3.00 | 4.477 | 1.56 | 0.193 |
| 16 | 1.38 | 0.140 | 2.18 | 0.338 | 1.40 | 0.146 |
| 19 | 1.3 | 0.114 | | | | |
| 20 | | | 1.94 | 0.288 | 0.8 | −0.097 |
| 22 | 0.75 | −0.125 | | | | |

FIG. 2 of the drawing is a graphical representation of the behavior of the performance of the three time indicators. The plot is of the logarithm of the internal diameter measured versus the number of 273° F. cycles to which the indicator has been exposed. The value of −0.1 is 1/10 of a millimeter. FIG. 2 indicates that up to 20 or more cycles can be measured quite effectively using the indicator of the present invention.

Figure 3:
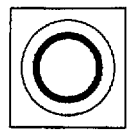
FIGS. 3–12 provide a visual sequence of the dye collecting above the valve member in a construction in accordance with the present invention.
Figure 4:
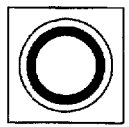
Figure 5:
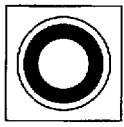
Figure 6:
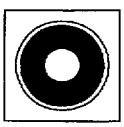
Figure 7:
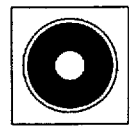
Figure 8:
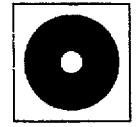
Figure 9:
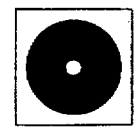
Figure 10:
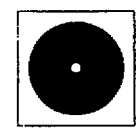
Figure 11:
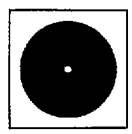
Figure 12:
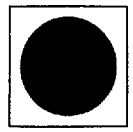

FIGS. 3–12 are photographs of the various measurements made with regard to indicator A. FIG. 3 is a photograph of the indicator prior to any exposures, with the internal diameter being 6.48 millimeters. The entire valve can be seen clearly as the clear portion in the middle of the dark circle or rim. FIG. 4 is a photograph after one cycle (with each cycle at 273° F. having a duration of 10 minutes). The internal diameter was measured as being 5.85 millimeters. FIG. 5 is a photograph of the indicator after two cycles, FIG. 6 after 3 cycles, FIG. 7 after 6 cycles, FIG. 8 after 8 cycles, FIG. 9 after 12 cycles, FIG. 10 after 16 cycles, FIG. 11 after 19 cycles, and FIG. 12 after 22 cycles. As can be seen from the various photographs, the dye migrated and collected over the valve until the valve was totally obscured and could not be seen any longer.

While the invention has been described with preferred embodiments, it is to be understood that variations and modifications may be resorted to as will be apparent to those skilled in the art. Such variations and modifications are to be considered to be within the purview and the scope of the claims appended hereto.

What is claimed is:

1. A valved temperature indicator comprising:

a base substrate;

an upper and a lower transparent polymeric layer on top of the base substrate with at least the upper layer having adhesive on a surface;

a valve member which is restrictive to the flow of dye therethrough interposed between the two polymer layers such that there is no adhesive contact between the polymeric layers in the area of the valve;

colored dye deposited on the lower polymeric layer or the base substrate so that the dye is visible and with the dye being positioned directly below the valve member so that the valve member partially obstructs visibility of the dye deposit;

whereby the dye migrates laterally through adhesive around the valve member, with migration in the adhesive of the upper polymeric layer above the valve member being inward so that the dye collects substantially over the valve member.

2. The valved indicator of claim 1, wherein both of the polymeric layers comprise adhesive surfaces and the adhesive surfaces of two transparent polymeric layers are in contact with each other such that the valve member is interposed between the two adhesive faces, and the dye migration is laterally through the bottom polymeric layer and through the adhesive around the valve member.

3. The valved indicator of claim 1, wherein both of the polymeric layers comprise adhesive surfaces and the adhesive of the lower polymeric layer is in contact with the substrate and the dye is deposited on the lower polymeric layer such that it is in contact with the valve member.

4. The valved indicator of claim 1, wherein the adhesive is an acrylic adhesive.

5. The valved indicator of claim 1, wherein each polymeric layer is comprised of a polypropylene polymer film.

6. A process for indicating exposure to an environment above a predetermined temperature, the process comprising providing the valved member of claim 1 wherein the dye migrates only at or above the predetermined temperature, exposing the valved indicator to an environment having a temperature at least that of said predetermined temperature, whereby the dye migrates laterally through adhesive around the valve member of the indicator during the exposure so that the dye collects substantially over the valve member, effecting the appearance of the valve member such that the valve member becomes obscured by the dye.

7. The process of claim 6, wherein the valved indicator is used in connection with a medical device.

8. The process of claim 6, wherein the valved indicator is comprised of an adhesive which is an acrylic adhesive.

9. The process of claim 6, wherein the valved indicator is comprised of a polymeric layer which comprises of a polypropylene polymer film.

10. The process of claim 6, wherein the process is repeated up to 20 times before the valve member is completely obscured by the dye, with the repetition of each successive process further obscuring the valve member by the dye until the valve member is completely obscured by the dye.

* * * * *